(12) United States Patent
Bae et al.

(10) Patent No.: US 7,450,898 B2
(45) Date of Patent: Nov. 11, 2008

(54) MULTI-FUNCTIONAL PERIPHERAL DEVICE

(75) Inventors: Sea-Chul Bae, Suwon-si (KR); Byung-Sun Ahn, Suwon-si (KR); Dong-Ha Chol, Suwon-si (KR); Sung-Won Kim, Gwanak-gu (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 371 days.

(21) Appl. No.: 11/319,059

(22) Filed: Dec. 28, 2005

(65) Prior Publication Data

US 2006/0139677 A1    Jun. 29, 2006

(30) Foreign Application Priority Data

Dec. 29, 2004    (KR)    ........... 10-2004-0115039

(51) Int. Cl.
    *G03G 15/00*    (2006.01)
(52) U.S. Cl. .............. 399/405; 399/363; 399/377
(58) Field of Classification Search ............ 358/1.13, 358/486; 399/363, 377, 393, 405; 400/693
    See application file for complete search history.

(56) References Cited

U.S. PATENT DOCUMENTS

| 5,389,414 | A | * | 2/1995 | Popat ............... 428/40.1 |
| 6,154,286 | A | * | 11/2000 | Konno et al. ......... 358/1.13 |
| 6,671,060 | B1 | * | 12/2003 | Fresk et al. .......... 358/1.15 |
| 7,341,387 | B2 | * | 3/2008 | Nishimura et al. ..... 400/693 |
| 2005/0185228 | A1 | * | 8/2005 | Seo ..................... 358/486 |

FOREIGN PATENT DOCUMENTS

| JP | 2001-199576 | 7/2001 |
| JP | 2002-082590 | 3/2002 |
| JP | 2002-311665 | 10/2002 |
| JP | 2003-307796 | 10/2003 |
| JP | 2004-069884 | 3/2004 |

* cited by examiner

*Primary Examiner*—Daniel J Colilla
*Assistant Examiner*—David Banh
(74) *Attorney, Agent, or Firm*—Roylance, Abrams, Berdo & Goodman, L.L.P.

(57) ABSTRACT

A multi-functional peripheral device is provided including a printing unit which develops images that are read from a document. A scanning unit is installed on the printing unit so as to rotate and read document images of the document. A loading unit loads the printing media and includes a plurality of portions configured to separate from each other when the scanning unit rotates.

18 Claims, 4 Drawing Sheets

MULTI-FUNCTIONAL PERIPHERAL DEVICE

CROSS-REFERENCE TO RELATED PATENT APPLICATIONS

This application claims the benefit under 35 U.S.C. § 119(a) of Korean Patent Application No. 10-2004-0115039, filed on Dec. 29, 2004, in the Korean Intellectual Property Office, the entire disclosure of which is hereby incorporated by reference.

BACKGROUND OF THE INVENTION

1. Field of the Invention

The present invention relates to a multi-functional peripheral device. More particularly, the present invention relates to a multi-functional peripheral device in which a part of a loading unit is moveably and integrally formed with a scanning unit.

2. Description of the Related Art

In general, a multi-functional peripheral device is a device capable of performing multi-functions by combining a scanning function to read a document and input an image, a printing function to print the image, and any other suitable functions in one device.

FIG. 1 is a side cross-sectional view of a conventional multi-functional peripheral device.

Referring to FIG. 1, the device includes a printing unit 10, a scanning unit, and a loading unit 70 installed between the printing unit 10 and the scanning unit 80 to load printing media (S). A toner image is fused onto the printing media (S) and discharged from the device.

The printing unit 10 prints desired images. The printing unit includes a cassette 20, a developing device 30, a transfer roller 32, a fuser 50, and a discharging device 60.

The cassette 20 loads the printing media (S) under a main body 1 of the device. The cassette 20 is detachably installed. A pickup roller 21 is installed on an upper portion of the cassette 20 to pick the printing media (S) up one by one.

In the developing device 30, a photosensitive drum 31 has a surface charged to a predetermined potential. An electrostatic latent image is formed on the photosensitive drum 31 by light irradiated by an exposing unit 40 such as a laser scanning unit (LSU). The photosensitive drum contacts a transfer roller 32 while interposing the printing media (S) therebetween. In addition, toner is stored in the developing device 30 and the toner is supplied to the photosensitive drum 31 to develop the electrostatic latent image into the toner image.

The transfer roller 32 is installed to contact the photosensitive drum 31. The transfer roller 32 presses the printing media (S) passing between the transfer roller 32 and the photosensitive drum 31 toward the photosensitive drum 31 so that the toner image formed on the photosensitive drum 31 can be transferred onto the printing media (S).

The fuser 50 is installed on a conveying path of the printing media (S). The fuser 50 heats and presses the toner image transferred onto the printing media (S) while the printing media (S) passes through the photosensitive drum 31 and the transfer roller 32 in order to fuse the toner image onto the printing media (S).

The discharging device 60 discharges the printing media (S), on which the toner image is fused by the fuser 50, onto the loading unit 70.

The scanning unit 80 is disposed above the main body 1 for inputting images by irradiating light onto a document. The scanning unit 80 includes a scanning frame 81 fixed on the upper portion of the main body and a cover 84 is rotatably installed on the scanning frame 81.

A glass plate 83 is installed at the upper portion of the scanning frame 81. An image sensor 82 reads the document placed on the glass plate 83 and inputs the image of the document disposed under the glass plate 83.

The printing medium (S) picked from the cassette 20 passes through the developing device 30 and the fuser 50 to form the image thereon. The printing medium (S) is discharged by the discharging device 60 and loaded in the loading unit 70.

The loading unit 70 can be divided into first and second loading units 71, 72, respectively. The first loading unit 71 has a height H1 from the scanning frame 81 to the bottom of the loading unit 70 and the second loading unit 72 has a height H2 that is less than H1.

If the printing media (S) loaded on the loading unit 70 is A4 size or larger, the edge of the printing media (S) can be placed on the second loading unit 71. Therefore, a user can relatively easily grab the printing media (S). However, if the printing media (S) has a size smaller than A4, the printing media (S) is loaded in the first loading unit 71, and it is relatively difficult for the user to draw out the printing media (S) by hand.

Since the space of the loading unit between the scanning unit and the printing unit is minimized in order to minimize the size of the entire device, the height H2 of the second loading unit 72 is reduced. Thus, it is difficult for the user to draw out the printing media (S) in a case where the printing media (S) has a small size such as a postcard.

Accordingly, there is a need for an improved multi-functional peripheral device including a loading unit which loads printing media including a plurality of portions that can be separated from each other when the scanning unit rotates.

SUMMARY OF THE INVENTION

An aspect of the embodiments of the present invention is to address at least the above problems and/or disadvantages and to provide at least the advantages described below. Accordingly, an aspect of the embodiments of the present invention is to provide a multi-functional peripheral device including a loading unit comprising an improved structure so that smaller sized printing media discharged onto the loading unit can be relatively easily drawn by a user while minimizing the size of the device.

According to an aspect of the embodiments of the present invention, there is provided a multi-functional peripheral device, which reads images on documents and forms the read images into images on printing media. The device includes a printing unit which develops images that are read from the document, a scanning unit installed on the printing unit so as to rotate and read document images of the document, and a loading unit which loads the printing media. The loading unit includes a plurality of portions configured to separate from each other when the scanning unit rotates.

Throughout the drawings, the same drawing reference numerals will be understood to refer to the same elements, features, and structures.

BRIEF DESCRIPTION OF THE DRAWINGS

The above and other objects, features, and advantages of certain exemplary embodiments of the present invention will be more apparent from the following description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
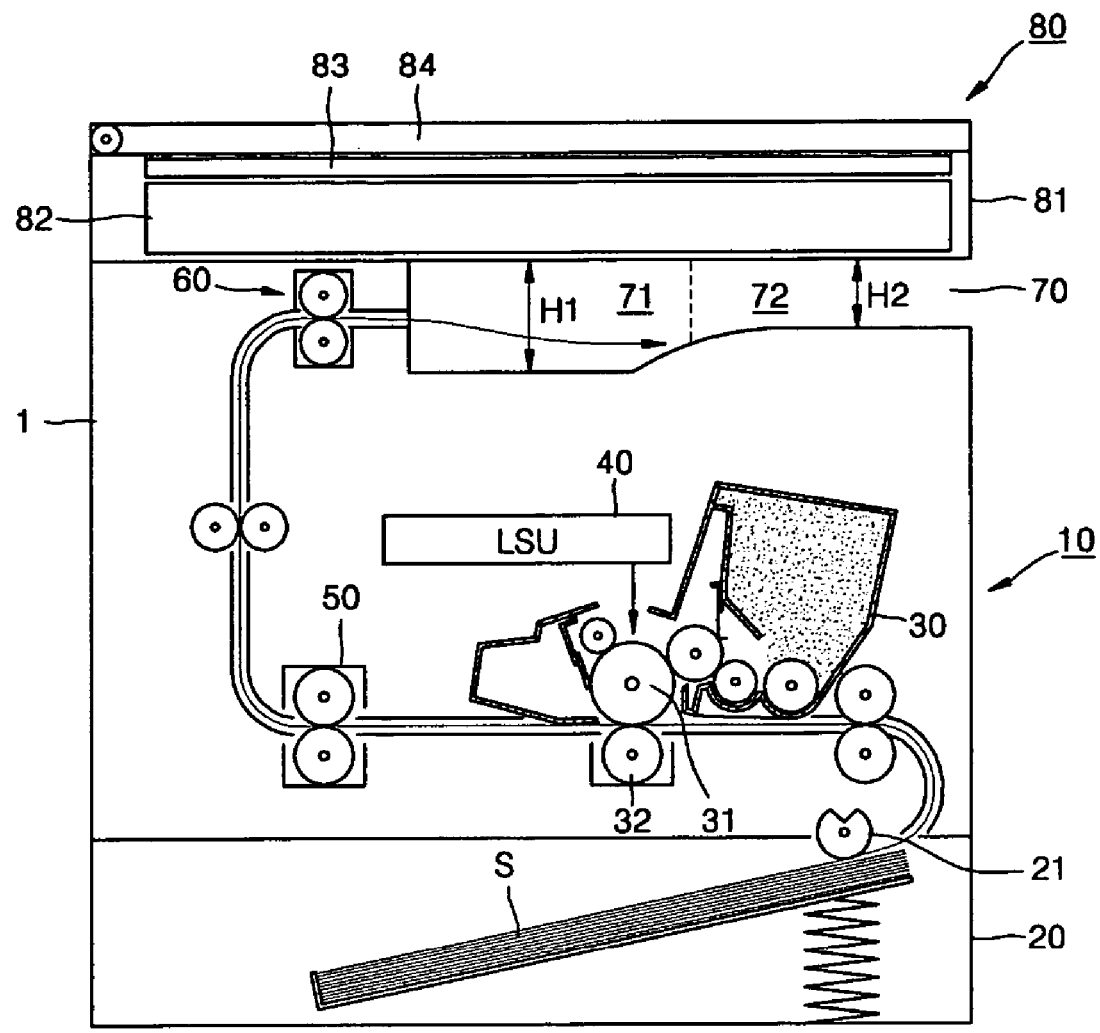
FIG. 1 is a side cross-sectional view of a conventional multi-functional peripheral device.
Figure 2:
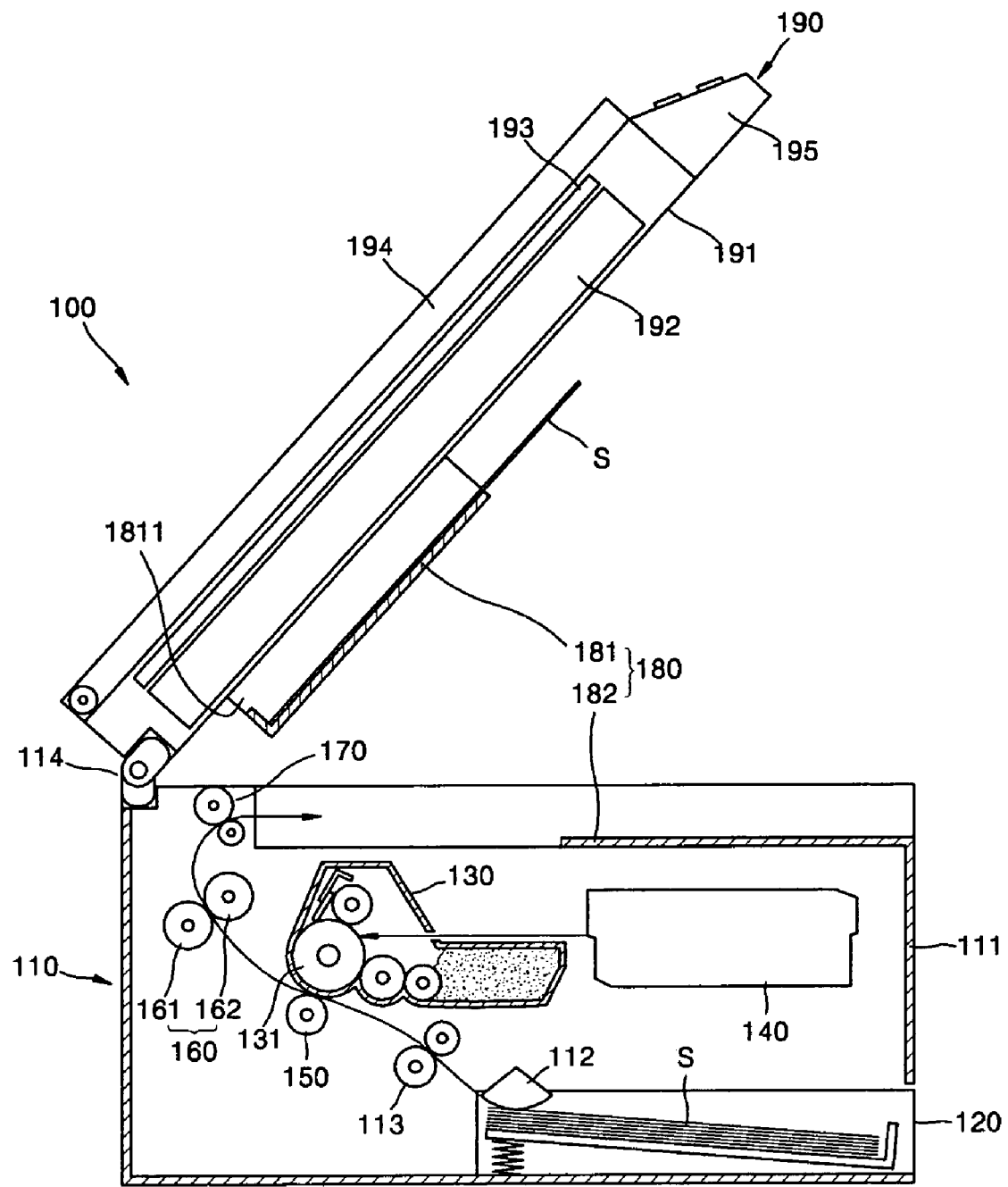
FIG. 2 is a side cross-sectional view of a multi-functional peripheral device including a loading unit according to exemplary embodiments of the present invention.

Referring to FIG. 2, a multi-functional peripheral device 100 includes a printing unit 110, a scanning unit 190, and a loading unit 180 installed between the printing unit 110 and the scanning unit 190. The loading unit 180 loads printing media (S) onto which toner images are fused.

The printing unit 110 prints desired images, and includes a cassette 120, a developing device 130, a transfer roller 150, a fusing device 160, and a discharging device 170.

The cassette 120 loads a plurality of printing media (S) under a main body 111 and is detachably installed on the main body 111. A pickup roller 112 is installed above the cassette 120 in order to pick up the printing media (S) one by one. The pickup roller 112 rotates to pickup a sheet of the printing media (S) and supplies the printing medium (S) toward the developing device 130.

The developing device 130 includes a photosensitive drum 131 having a surface discharged to a predetermined potential on which an electrostatic latent image is formed by the light irradiated by an exposing unit 140 such as a laser scanning unit (LSU). The photosensitive drum 131 contacts a transfer roller 150 while interposing the printing media (S) therebetween. In addition, toner is stored in the developing device 130, and the toner is supplied to the photosensitive drum 131 to develop the electrostatic latent image into the toner image.

The transfer roller 150 is installed to contact the photosensitive drum 131, and presses the printing media (S) passing between the transfer roller 150 and the photosensitive drum 131 toward the photosensitive drum 131. Thus, the toner image formed on the photosensitive drum 131 can be transferred onto the printing media (S).

The fuser 160 is installed on a conveying path of the printing media (S). The fuser 160 heats and presses the toner image transferred onto the printing media (S) while the printing media (S) passes through the photosensitive drum 131 and the transfer roller 150 in order to fuse the toner image onto the printing media (S). The fusing device 160 includes a heating roller 161 to generate heat and a pressing roller 162 to contact the heating roller 161 to press the printing media (S) passing therebetween toward the heating roller 161.

The discharging device 170 discharges the printing media (S) on which the toner image is fused by the fusing device 160 onto the loading unit 180.

The scanning unit 190 is disposed on the upper portion of the printing unit 110 to input images by irradiating light onto a document. In addition, the scanning unit 190 includes a scanning frame 191 rotatably installed on the main body 111 of the printing unit 110 using a hinge 114. A cover 194 is rotated based on the scanning frame 191.

A glass plate 193 is installed on the scanning frame 191. An image sensor 192 reads the image of the document put on the glass plate 193 and inputs the image installed under the glass plate 193. The image sensor 192 slides with respect to the scanning frame 191 and irradiates the light onto the document. The image sensor 192 reads out the image while sliding under the document.

Figure 3:
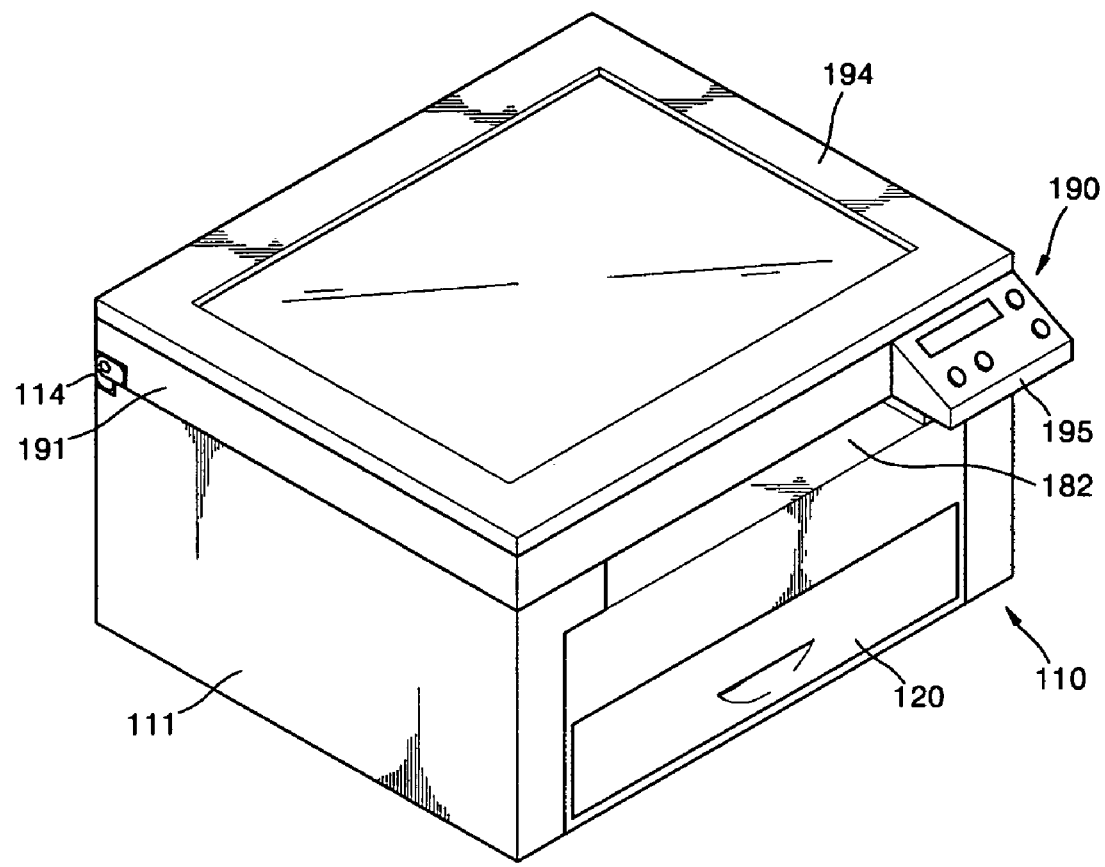
FIG. 3 is a perspective view of a scanning unit coupled to a printing unit according to the embodiments of the present invention.
Figure 4:
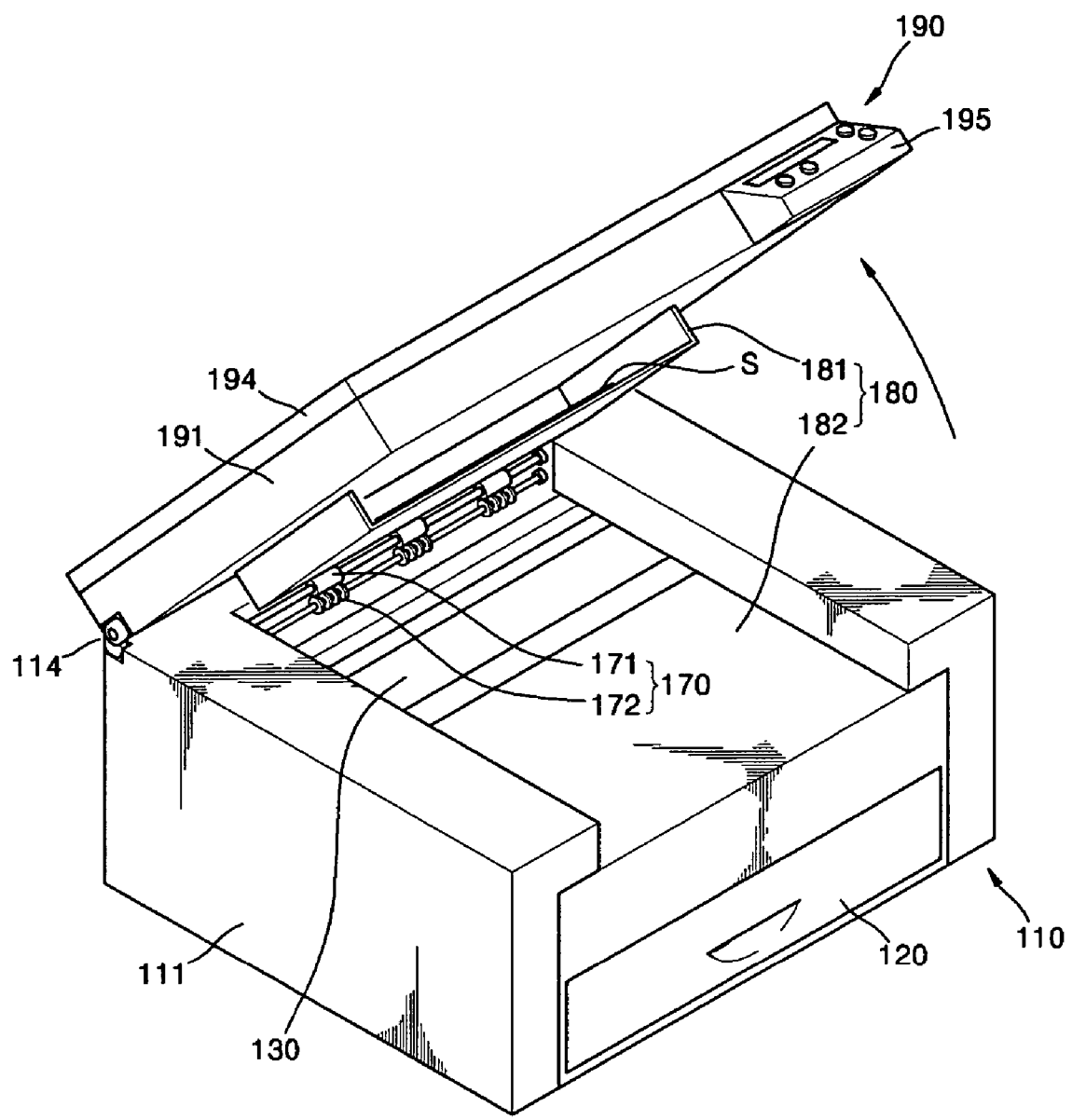
FIG. 4 is a perspective view of the scanning unit rotated from the printing unit according to the embodiments of the present invention.

Referring to FIGS. 2 through 4, the loading unit 180, on which the printing media (S) is discharged by the discharging device 170, includes a first loading unit 181 and a second loading unit 182.

The first loading unit 181 is disposed under the scanning frame 191. The second loading unit 182 is disposed on the printing unit 110. When the scanning unit 190 is coupled to the printing unit 110, the first loading unit 181 is located in parallel to the second loading unit 182 to complete the loading unit 180.

When the scanning unit 190 separates from the printing unit 110 by rotating via the hinge 114, the first loading unit 181 moves with the scanning unit 190 and separates from the printing unit 110. Then, the first loading unit 181 separates from the second loading unit 182.

Smaller sized printing media (S) such as the envelope are loaded on the first loading unit 181. Larger sized printing media (S) such as A4 size paper are loaded on the second loading unit 182. When the larger sized printing media (S) such as A4 size media are loaded, the first and second loading units 181 and 182 should support the media together.

It is desirable that the first loading unit 181 includes a discharge opening 1811 so that the printing media (S) passing through the discharging device 170 can be loaded through the first loading unit 181.

The smaller sized printing media (S) such as the envelope pass through the developing device 130 and the fusing device 160 to form the images thereon. The smaller sized printing media is then loaded on the first loading unit 181 by the discharging device 170. When the user draw the printing media (S) loaded on the first loading unit 181 out, the scanning unit 190 is lifted to separate from the printing unit 110. Here, the first loading unit 181 moves with the scanning unit 190 and separates from the second loading unit 182.

The printing media (S) loaded on the first loading unit 181 are exposed to the outside, and thus, the user simply grabs the printing media (S) by hand.

In addition, referring to FIGS. 3 and 4, the larger sized printing media (S) such as A4 size paper are supported by the first and second loading units 181 and 182 in a state where the scanning unit 190 is coupled to the printing unit 110. Since the second loading unit 182 communicates with the outside, the user can draw out the printing media (S) by hand.

When the scanning unit 190 rotates with respect to the printing unit 110 and the first loading unit 181 separates from the second loading unit 182, the first loading unit 181 separates from the printing unit 110 and a part of the printing unit 110 is exposed to the outside. The developing device 130 can separated from or attached to the printing unit 110 using the exposed portion of the printing unit 110.

That is, the first loading unit 181 acts as a cover when the developing device 130 separates or attaches from/into the printing unit 110 in order to replace the developing device 130.

Operations of reading the image of document or forming the image of the multi-functional peripheral device including the loading unit according to the exemplary embodiments of the present invention are as follows.

In order to read the image of the document, the cover 194 is opened and the document is placed on the glass plate 193. Then, the cover 194 is closed. Then, the image sensor 192 slides under the glass plate 193 and irradiates the light onto the document to read the image formed on the document.

The read image of the document is converted into a digital signal and transmitted to the printing unit 110.

The printing unit 110 forms images corresponding to the transmitted digital signal, and the exposing unit 140 irradiates light onto the surface of the photosensitive drum 131. As a result, an electrostatic latent image is formed corresponding to the digital signal on the photosensitive drum 131.

The developing device 130 develops the electrostatic latent image formed on the photosensitive drum 131 using the toner. The toner image is transferred onto the printing medium (S) by the transfer roller 150.

The printing medium (S), on which the toner image is transferred, passes through the fusing device 160, then the toner image is fused onto the printing medium (S). Subsequently, the printing medium (S) passes through the discharging device 170 and is loaded on the loading unit 180.

As described above, a part of the loading unit is disposed on the scanning unit according to the exemplary embodiments of the present invention, and thus, the user can relatively easily access smaller sized printing media, and the volume of the loading unit can be reduced and the device can be minimized.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A multi-functional peripheral device, which reads images on documents and forms the read images into images on printing media, the device comprising:
    a printing unit which develops images that are read from the documents and produces printed media;
    a scanning unit installed on the printing unit to read document images from the document, the scanning unit being rotatably connected to the printing unit; and
    a loading unit for receiving the printed media from the printing unit, the loading unit including a first portion capable of carrying printed media and being coupled to and disposed substantially below the scanning unit and a second portion capable of carrying printed media and being coupled to and disposed on the printing unit, wherein the first and second portions separate from each other when the scanning unit rotates with respect to the printing unit.

2. The device of claim 1, wherein the first loading portion separates from the second loading portion when the scanning unit rotates with respect to the printing unit and separates from the printing unit.

3. The device of claim 1, wherein the printed media of smaller sizes are loaded on the first loading portion, and the printed media of larger sizes are loaded throughout the first and second loading portions.

4. The device of claim 1, wherein the first loading portion has a discharge opening so that the printed media can pass through the discharge opening.

5. The device of claim 1, wherein the first loading portion is integrally attached on the scanning unit.

6. A multi-functional peripheral device to form images on printing media, comprising:
    a printing unit which develops the images that are read from a document and produces printed media;
    a scanning unit installed on the printing unit to read document images from the document, the scanning unit being connected to and rotatable with respect to the printing unit; and
    a loading unit which receives the printed media from the printing unit including first loading portion capable of carrying printed media and being disposed substantially below and coupled to the scanning unit and a second loading portion capable of carrying printed media and being disposed on the printing unit and configured to separate from each other when the scanning unit rotates with respect to the printing unit.

7. The device of claim 6, wherein the first loading portion separates from the second loading unit when the scanning portion rotates with respect to the printing unit and separates from the printing unit.

8. The device of claim 6, wherein the printed media of smaller sizes are loaded on the first loading portion, and the printed media of larger sizes are loaded throughout the first and second loading portions.

9. The device of claim 6, wherein the first loading portion has a discharge opening so that the printed media passes through the discharge opening.

10. The device of claim 6, wherein the first loading portion is integrally attached on the scanning unit.

11. The device of claim 1, wherein said first and second loading portions are aligned and substantially parallel to each other when said scanning unit is in a closed portion with respect to the printing unit.

12. The device of claim 1, wherein said scanning unit is rotatable with respect to the printing unit between a closed position and an open position, and where the first loading portion is separated form the second loading portion when the scanning unit is in the open position.

13. The device of claim 12, wherein said the first loading portion is accessible when the scanning unit is in the open position.

14. The device of claim 13, wherein said first loading portion has a first end and a second end, the first end having an inlet for receiving the printed media from the printing unit, the second loading portion having a first end for receiving the printed media from the second end of the first loading portion.

15. The device of claim 6, wherein said first and second loading portions are aligned and substantially parallel to each other when said scanning unit is in a closed position with respect to the printing unit.

16. The device of claim 6, wherein said scanning unit is rotatable with respect to the printing unit between a closed position and an open position, and where the first loading portion is separated form the second loading portion when the scanning unit is in the open position.

17. The device of claim 6, wherein said the first loading portion is accessible when the scanning unit is in the open position.

18. The device of claim 6, wherein said first loading portion has a first end and a second end, the first end having an inlet for receiving the printed media from the printing unit, the second loading portion having a first end for receiving the printed media from the second end of the first loading portion.

* * * * *